United States Patent
Nanjo et al.

(10) Patent No.: US 11,987,338 B2
(45) Date of Patent: May 21, 2024

(54) MARINE VESSEL MANEUVERING SYSTEM AND MARINE VESSEL

(71) Applicant: YAMAHA HATSUDOKI KABUSHIKI KAISHA, Iwata (JP)

(72) Inventors: Morihiko Nanjo, Shizuoka (JP); Noriyuki Oba, Shizuoka (JP); Yuji Ikegaya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 389 days.

(21) Appl. No.: 17/467,692

(22) Filed: Sep. 7, 2021

(65) Prior Publication Data

US 2022/0081096 A1    Mar. 17, 2022

(30) Foreign Application Priority Data

Sep. 15, 2020    (JP) .................................. 2020-154645

(51) Int. Cl.
| | |
|---|---|
| *B63H 25/02* | (2006.01) |
| *B63B 79/40* | (2020.01) |
| *B63H 21/17* | (2006.01) |
| *B63H 21/21* | (2006.01) |
| *B63H 25/42* | (2006.01) |
| *B63H 25/52* | (2006.01) |
| *G05D 1/00* | (2006.01) |

(52) U.S. Cl.
CPC ............. *B63H 25/02* (2013.01); *B63B 79/40* (2020.01); *B63H 21/17* (2013.01); *B63H 21/213* (2013.01); *B63H 25/42* (2013.01); *B63H 25/52* (2013.01); *G05D 1/0016* (2013.01); *B63H 2021/216* (2013.01); *B63H 2025/028* (2013.01)

(58) Field of Classification Search
CPC ...... B63H 25/02; B63H 21/17; B63H 21/213; B63H 25/42; B63H 25/52; B63H 2021/216; B63H 2025/028; B63B 79/40; G05D 1/0016
See application file for complete search history.

(56) References Cited

U.S. PATENT DOCUMENTS

| | | | | |
|---|---|---|---|---|
| 7,267,068 | B2 * | 9/2007 | Bradley | ................. B63H 25/42 114/144 R |
| 7,305,928 | B2 * | 12/2007 | Bradley | ................. B63H 25/42 114/144 R |
| 10,766,589 | B1 | 9/2020 | Ito | |

(Continued)

FOREIGN PATENT DOCUMENTS

| | | | |
|---|---|---|---|
| EP | 3578454 A1 * | 12/2019 | ............. B63H 20/12 |
| JP | 2003-175854 A | 6/2003 | |

(Continued)

OTHER PUBLICATIONS

Official Communication issued in corresponding European Patent Application No. 21196288.1, mailed on Feb. 17, 2022.

*Primary Examiner* — Gertrude Arthur Jeanglaude

(74) *Attorney, Agent, or Firm* — Keating & Bennett, LLP

(57) ABSTRACT

A marine vessel maneuvering system includes a controller configured or programmed to control a steering speed to be a first steering speed when an operator is moved from a neutral position, and to control the steering speed to be a second steering speed that is lower than the first steering speed when the operator is returned to the neutral position.

18 Claims, 5 Drawing Sheets

(56) References Cited

U.S. PATENT DOCUMENTS

| | | | |
|---|---|---|---|
| 10,946,895 B2 * | 3/2021 | Inoue | B62D 5/006 |
| 2005/0092225 A1 * | 5/2005 | Kaji | B63H 25/42 |
| | | | 114/144 R |
| 2005/0164569 A1 * | 7/2005 | Kaji | B63H 23/30 |
| | | | 440/75 |
| 2007/0277721 A1 | 12/2007 | Crotts | |
| 2014/0329422 A1 | 11/2014 | Ito | |
| 2015/0166159 A1 | 6/2015 | Inoue et al. | |
| 2018/0257750 A1 | 9/2018 | Suzuki et al. | |
| 2019/0377347 A1 | 12/2019 | Mizutani | |
| 2021/0163114 A1 | 6/2021 | Bondesson et al. | |

FOREIGN PATENT DOCUMENTS

| | | |
|---|---|---|
| JP | 2005-214104 A | 8/2005 |
| JP | 4791340 B2 | 10/2011 |
| JP | 2013-163439 A | 8/2013 |
| JP | 2015-116847 A | 6/2015 |
| WO | 2017/082248 A1 | 5/2017 |

* cited by examiner

CONTROL OF PROPULSIVE FORCE AND STEERING ASSOCIATED WITH TURNING AND LATERAL MOVEMENT OF MARINE VESSEL

|  | WHEN JOYSTICK IS MOVED (OPERATED) FROM NEUTRAL POSITION | WHEN JOYSTICK IS RETURNED TO NEUTRAL POSITION |
|---|---|---|
| PROPULSIVE FORCE GENERATOR | ROTATE PROPELLER | STOP PROPELLER |
| STEERING MECHANISM | FIRST STEERING SPEED V1 | SECOND STEERING SPEED V2 |

MARINE VESSEL MANEUVERING SYSTEM AND MARINE VESSEL

CROSS REFERENCE TO RELATED APPLICATIONS

This application claims the benefit of priority to Japanese Patent Application No. 2020-154645 filed on Sep. 15, 2020. The entire contents of this application are hereby incorporated herein by reference.

BACKGROUND OF THE INVENTION

1. Field of the Invention

The present invention relates to a marine vessel maneuvering system and a marine vessel, and more particularly, it relates to a marine vessel maneuvering system and a marine vessel, both of which control a propulsive force and steering based on a user's operation.

2. Description of the Related Art

A marine vessel maneuvering system that controls a propulsive force and steering based on a user's operation is known in general. Such a marine vessel maneuvering system is disclosed in International Publication No. 2017/082248, for example.

International Publication No. 2017/082248 discloses a marine propulsion unit that propels a hull. The marine propulsion unit disclosed in International Publication No. 2017/082248 includes a propeller driven by a motor, a steering shaft, a motor controller, and a steering mechanism. The marine propulsion unit disclosed in International Publication No. 2017/082248 is attached to the hull. A remote control and a steering wheel are provided on the hull. In the marine propulsion unit disclosed in International Publication No. 2017/082248, rotational driving of the propeller is controlled by the motor controller based on a user's operation on the remote controller such that the magnitude of a propulsive force to propel the hull is adjusted. Furthermore, the steering shaft is rotated by the steering mechanism based on a user's operation on the steering wheel such that the direction of the propulsive force is adjusted.

Although not disclosed in International Publication No. 2017/082248, in a conventional marine propulsion unit including a propeller driven by a motor as disclosed in International Publication No. 2017/082248, when a marine vessel is turned or laterally moved, for example, both the magnitude of a propulsive force and a steering angle are adjusted based on a user's operation on an operator when the operator is moved from a neutral position by the user's operation on the operator. Then, when the operator is returned to the neutral position, the steering angle is returned to a reference position (a position at which the direction of the propulsive force is parallel or substantially parallel to the forward-rearward direction of the hull) with generation of the propulsive force by the motor stopped. In such a case, a steering mechanism is driven without generation of a propulsive force and generation of a water flow, and thus the driving noise of the steering mechanism is noticeable unlike a case in which the steering mechanism is driven with generation of a water flow. When the operator is returned to the neutral position, the driving noise of the steering mechanism is noticeable even when the steering angle is returned to the reference position without completely stopping generation of the propulsive force by the motor and with generation of a relatively small propulsive force. When the propeller is driven by an engine, relatively loud operating noise is continuously generated by idling even with generation of the propulsive force stopped, and thus the driving noise of the steering mechanism is unlikely to be noticeable. On the other hand, when the propeller is driven by the motor, driving of the motor is stopped with generation of a propulsive force stopped, and thus the driving noise of the steering mechanism is particularly likely to be noticeable. Therefore, there is a desire to significantly reduce or prevent the driving noise of the steering mechanism.

SUMMARY OF THE INVENTION

Preferred embodiments of the present invention provide marine vessel maneuvering systems and marine vessels that each significantly reduce or prevent driving noise of steering mechanisms.

A marine vessel maneuvering system according to a preferred embodiment of the present invention includes a propulsive force generator to generate a propulsive force to propel a marine vessel, a steering mechanism to steer the propulsive force generator, and a controller configured or programmed to control the propulsive force of the propulsive force generator and steering by the steering mechanism based on a user's operation on an operator to maneuver the marine vessel. The controller is configured or programmed to control a steering speed to be a first steering speed when the operator is moved from a neutral position, and to control the steering speed to be a second steering speed that is lower than the first steering speed when the operator is returned to the neutral position.

In a marine vessel maneuvering system according to a preferred embodiment of the present invention, the controller is configured or programmed to control the steering speed to be the first steering speed when the operator is moved from the neutral position, and to control the steering speed to be the second steering speed that is lower than the first steering speed when the operator is returned to the neutral position. Accordingly, when the operator is returned to the neutral position, the steering speed at which the steering angle is returned to the reference position becomes relatively low. Therefore, when the steering angle is returned to the reference position, the driving speed of the steering mechanism is decreased such that the driving noise of the steering mechanism becomes relatively small. Consequently, the driving noise of the steering mechanism is significantly reduced or prevented. This advantageous effect is particularly effective when a propulsive force generator driven by a motor is provided in which the driving noise of a steering mechanism is likely to be noticeable. Furthermore, the operation of components of the steering mechanism is significantly reduced or prevented by a decrease in the driving speed of the steering mechanism at which the steering angle is returned to the reference position, and thus the life of the components of the steering mechanism is improved.

In a marine vessel maneuvering system according to a preferred embodiment of the present invention, the controller is preferably configured or programmed to control the steering speed to be the second steering speed when the operator is returned to the neutral position and the propulsive force of the propulsive force generator is stopped. Accordingly, the steering speed at which the steering angle is returned to the reference position when the propulsive force is stopped becomes relatively low. Consequently, a propulsive force is not generated, and a water flow is not generated. Thus, the steering speed becomes relatively low in a state in which the driving noise of the steering mechanism is likely to be noticeable, and thus the driving noise of the steering mechanism due to driving of the steering mechanism is effectively significantly reduced or prevented.

In a marine vessel maneuvering system according to a preferred embodiment of the present invention, the controller is preferably configured or programmed to control the steering speed to be the second steering speed by adjusting a steering angle command value or a speed command value output to the steering mechanism when the operator is returned to the neutral position. Accordingly, the steering angle command value as the target value of the steering angle is continuously adjusted such that the steering speed is indirectly adjusted, and the speed command value as the speed of steering is adjusted such that the steering speed is directly adjusted. Thus, the steering speed at which the steering angle is returned to the reference position is easily controlled to be the second steering speed.

In such a case, the controller is preferably configured or programmed to determine whether or not an actual steering angle that changes in response to the steering angle command value has reached the steering angle command value when the operator is returned to the neutral position, and to control the steering speed to be the second steering speed when it is determined that the actual steering angle has reached the steering angle command value. Accordingly, when the steering angle is returned to the reference position, the steering speed is controlled to be the second steering speed after the actual steering angle reaches the steering angle command value, and thus the steering angle command value is appropriately controlled such that the steering speed becomes the second steering speed.

In a marine vessel maneuvering system including the controller configured or programmed to control the steering speed to be the second steering speed by adjusting the steering command value or the speed command value, the controller is preferably configured or programmed to control the steering speed to be the second steering speed by adjusting the steering angle command value at predetermined intervals. Accordingly, the steering angle command value as the target value of the steering angle is adjusted at the predetermined intervals, and thus the steering speed at which the steering angle is returned to the reference position is more easily controlled to be the second steering speed.

In a marine vessel maneuvering system according to a preferred embodiment of the present invention, the controller is preferably configured or programmed to control the steering speed to be the second steering speed when the operator including at least one of a joystick, a steering wheel, or a remote control to maneuver the marine vessel is returned to the neutral position. Accordingly, in the marine vessel maneuvering system in which the marine vessel is maneuvered based on a user's operation on at least one of the joystick, the steering wheel, or the remote control, the steering speed at which the steering angle is returned to the reference position is relatively reduced such that driving noise is significantly reduced or prevented.

In a marine vessel maneuvering system according to a preferred embodiment of the present invention, the controller is preferably configured or programmed to control the steering speed to be the second steering speed based on the operator being returned to the neutral position after an operation of at least one of turning, lateral movement, or rotation of the marine vessel is performed. Accordingly, the steering speed at which the steering angle is returned to the reference position after the marine vessel is turned, laterally moved, or rotated becomes relatively low. Consequently, when the operator is returned to the neutral position after the marine vessel is turned, laterally moved, or rotated, a propulsive force is not generated, and a water flow is not generated. Thus, the steering speed becomes relatively low in a state in which the driving noise of the steering mechanism is likely to be noticeable, and thus the driving noise of the steering mechanism due to driving of the steering mechanism is effectively significantly reduced or prevented.

In a marine vessel maneuvering system according to a preferred embodiment of the present invention, the second steering speed is preferably set to one half or less of the first steering speed. Accordingly, the steering speed at which the steering angle is returned to the reference position is sufficiently decreased such that the driving noise of the steering mechanism is significantly reduced or prevented.

In such a case, the first steering speed is preferably set to a maximum settable steering speed, and the second steering speed is preferably set to one half or less of the first steering speed. Accordingly, the operator is operated such that the steering speed at which the steering angle is returned to the reference position is sufficiently decreased such that the driving noise of the steering mechanism is significantly reduced or prevented without decreasing the steering speed occurring when the operator is moved from the neutral position.

In a marine vessel maneuvering system according to a preferred embodiment of the present invention, the controller is preferably configured or programmed to control the steering speed to be a constant second steering speed when the operator is returned to the neutral position. Accordingly, as compared with a case in which the second steering speed is changed, a control process of the steering speed at which the steering angle is returned to the reference position is simplified.

In a marine vessel maneuvering system according to a preferred embodiment of the present invention, the controller is preferably configured or programmed to control the steering mechanism to change the steering speed from the second steering speed to the first steering speed when the operator is moved from the neutral position while the steering mechanism is steering the propulsive force generator at the second steering speed. Accordingly, even when a subsequent operation is performed on the operator while the steering angle is being returned to the reference position with the steering speed decreased from the first steering speed to the second steering speed, steering by the steering mechanism is immediately controlled with the steering speed returned from the second steering speed to the first steering speed based on the subsequent operation on the operator.

In a marine vessel maneuvering system according to a preferred embodiment of the present invention, the steering mechanism preferably includes a motor, a steering shaft to perform the steering, and a plurality of gears to transmit a rotational force of the motor to the steering shaft, and the controller is preferably configured or programmed to control the steering mechanism to change the steering speed between the first steering speed and the second steering speed by adjusting a current supplied to the motor. Accordingly, the current supplied to the motor is adjusted such that the steering speed is easily controlled to the first steering speed and the second steering speed via the plurality of gears and the steering shaft. Furthermore, the operation of the motor, the gears, and the steering shaft is significantly reduced or prevented by a decrease in the driving speed of the steering mechanism at which the steering angle is returned to the reference position. Therefore, the life of the motor, the gears, and the steering shaft is improved.

In such a case, the motor of the steering mechanism preferably includes a DC motor with a brush. Accordingly, the operation of the brush of the DC motor is significantly reduced or prevented by a decrease in the driving speed of the steering mechanism at which the steering angle is returned to the reference position, and thus the life of the motor is effectively improved.

In a marine vessel maneuvering system according to a preferred embodiment of the present invention, the controller is preferably configured or programmed to perform a feedback control on the steering by the steering mechanism by a proportional integral (PI) control. Accordingly, the accuracy of a control of steering by the steering mechanism is improved, and thus the accuracy of a control to change the steering speed to the second steering speed is improved.

In a marine vessel maneuvering system according to a preferred embodiment of the present invention, the propulsive force generator and the steering mechanism preferably include a plurality of sets of propulsive force generators and steering mechanisms, and the controller is preferably configured or programmed to control steering speeds of the steering mechanisms to the second steering speed when the operator is returned to the neutral position. Accordingly, even when a plurality of sets of propulsive force generators and steering mechanism are provided, the steering speeds of all the plurality of steering mechanisms are controlled to the second steering speed, and thus the steering speed at which the steering angle is returned to the reference position becomes relatively low without shifting the timing of returning the steering angle to the reference position among the plurality of steering mechanisms.

A marine vessel according to a preferred embodiment of the present invention includes a hull and a marine propulsion unit attached to the hull. The marine propulsion unit includes a propulsive force generator to generate a propulsive force to propel the marine vessel, and a steering mechanism to steer the propulsive force generator. The hull includes an operator to maneuver the marine vessel, and a controller configured or programmed to control the propulsive force of the propulsive force generator and steering by the steering mechanism based on a user's operation on the operator. The controller is configured or programmed to control a steering speed to be a first steering speed when the operator is moved from a neutral position, and to control the steering speed to be a second steering speed that is lower than the first steering speed when the operator is returned to the neutral position.

In a marine vessel according to a preferred embodiment of the present invention, the controller is configured or programmed to control the steering speed to be the first steering speed when the operator is moved from the neutral position, and to control the steering speed to be the second steering speed that is lower than the first steering speed when the operator is returned to the neutral position, similarly to the marine vessel maneuvering system according to preferred embodiments of the present invention described above. Accordingly, the steering speed at which the steering angle is returned to the reference position becomes relatively low, similarly to the marine vessel maneuvering system according to preferred embodiments of the present invention described above. Consequently, the driving noise of the steering mechanism is significantly reduced or prevented, similarly to the marine vessel maneuvering system according to preferred embodiments of the present invention described above. This advantageous effect is particularly effective when a propulsive force generator driven by a motor is provided in which the driving noise of a steering mechanism is likely to be noticeable, similarly to the marine vessel maneuvering system according to preferred embodiments of the present invention described above. Furthermore, the life of components of the steering mechanism is improved, similarly to the marine vessel maneuvering system according to preferred embodiments of the present invention described above.

In a marine vessel according to a preferred embodiment of the present invention, the controller is preferably configured or programmed to control the steering speed to be the second steering speed when the operator is returned to the neutral position and the propulsive force of the propulsive force generator is stopped. Accordingly, a propulsive force is not generated, and a water flow is not generated, similarly to the marine vessel maneuvering system according to preferred embodiments of the present invention described above. Thus, the steering speed becomes relatively low in a state in which the driving noise of the steering mechanism is likely to be noticeable, and thus the driving noise of the steering mechanism due to driving of the steering mechanism is effectively significantly reduced or prevented.

In a marine vessel according to a preferred embodiment of the present invention, the controller is preferably configured or programmed to control the steering speed to be the second steering speed by adjusting a steering angle command value or a speed command value output to the steering mechanism when the operator is returned to the neutral position. Accordingly, the steering speed at which the steering angle is returned to the reference position is easily controlled to be the second steering speed, similarly to the marine vessel maneuvering system according to preferred embodiments of the present invention described above.

In such a case, the controller is preferably configured or programmed to determine whether or not an actual steering angle that changes in response to the steering angle command value has reached the steering angle command value when the operator is returned to the neutral position, and to control the steering speed to be the second steering speed when it is determined that the actual steering angle has reached the steering angle command value. Accordingly, the steering angle command value is appropriately controlled such that the steering speed becomes the second steering speed, similarly to the marine vessel maneuvering system according to preferred embodiments of the present invention described above.

In a marine vessel including the controller configured or programmed to control the steering speed to be the second steering speed by adjusting the steering angle command value or the speed command value, the controller is preferably configured or programmed to control the steering speed to be the second steering speed by adjusting the steering angle command value at predetermined intervals. Accordingly, the steering speed at which the steering angle is returned to the reference position is more easily controlled be to the second steering speed, similarly to the marine vessel maneuvering system according to preferred embodiments of the present invention described above.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structure of a marine vessel maneuvering system 100 and the structure of a marine vessel 110 according to preferred embodiments of the present invention are now described with reference to FIGS. 1 to 7. The marine vessel maneuvering system 100 is a system to maneuver the marine vessel 110. The marine vessel maneuvering system 100 is provided in the marine vessel 110.

Figure 1:
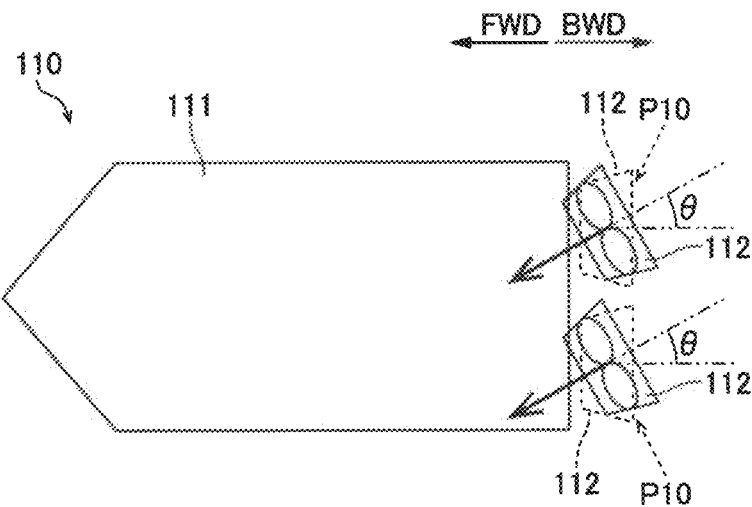
FIG. 1 is a schematic view showing a marine vessel according to a preferred embodiment of the present invention.

As shown in FIG. 1, the marine vessel 110 (marine vessel maneuvering system 100 (see FIG. 3)) includes a hull 111 and marine propulsion units 112. The marine propulsion units 112 are attached to the rear of the hull 111. That is, the marine propulsion units 112 are outboard motors. The marine vessel 110 is used for sightseeing in a canal and a lake, for example. The marine vessel 110 is a relatively small marine vessel. Arrow FWD and arrow BWD in FIG. 1 represent the front side and the rear side of the marine vessel 110, respectively.

Figure 2:
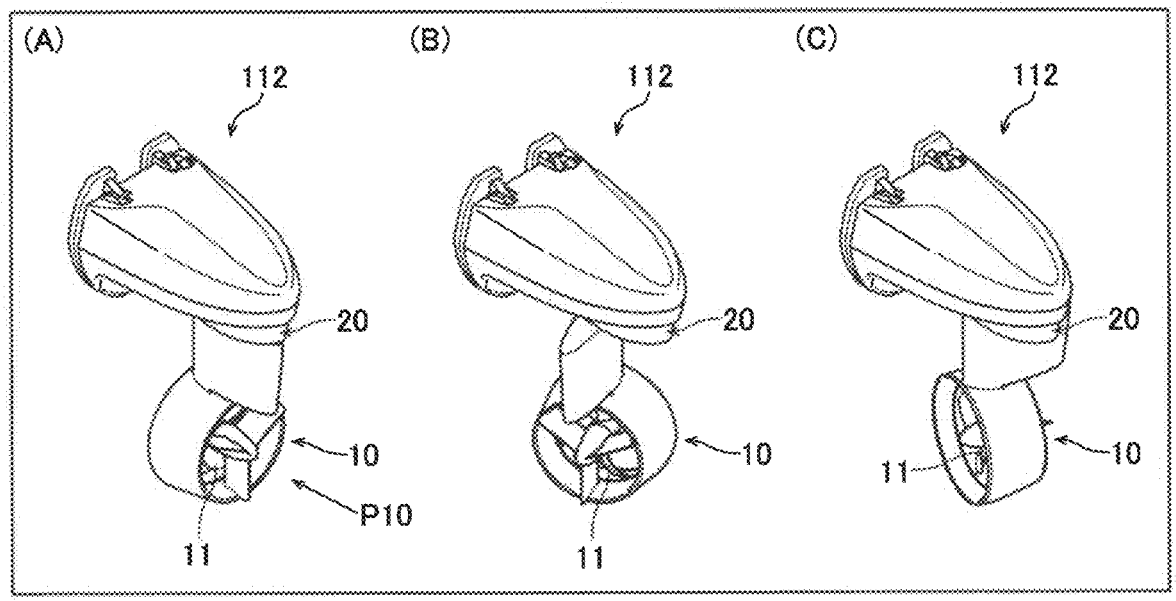
FIG. 2 is a perspective view showing a marine propulsion unit according to a preferred embodiment of the present invention.

As shown in FIG. 2, each of the marine propulsion units 112 (marine vessel maneuvering system 100 (see FIG. 3)) includes a propulsive force generator 10 to generate a propulsive force to propel the marine vessel 110 and a steering mechanism 20 to steer the propulsive force generator 10.

Figure 3:
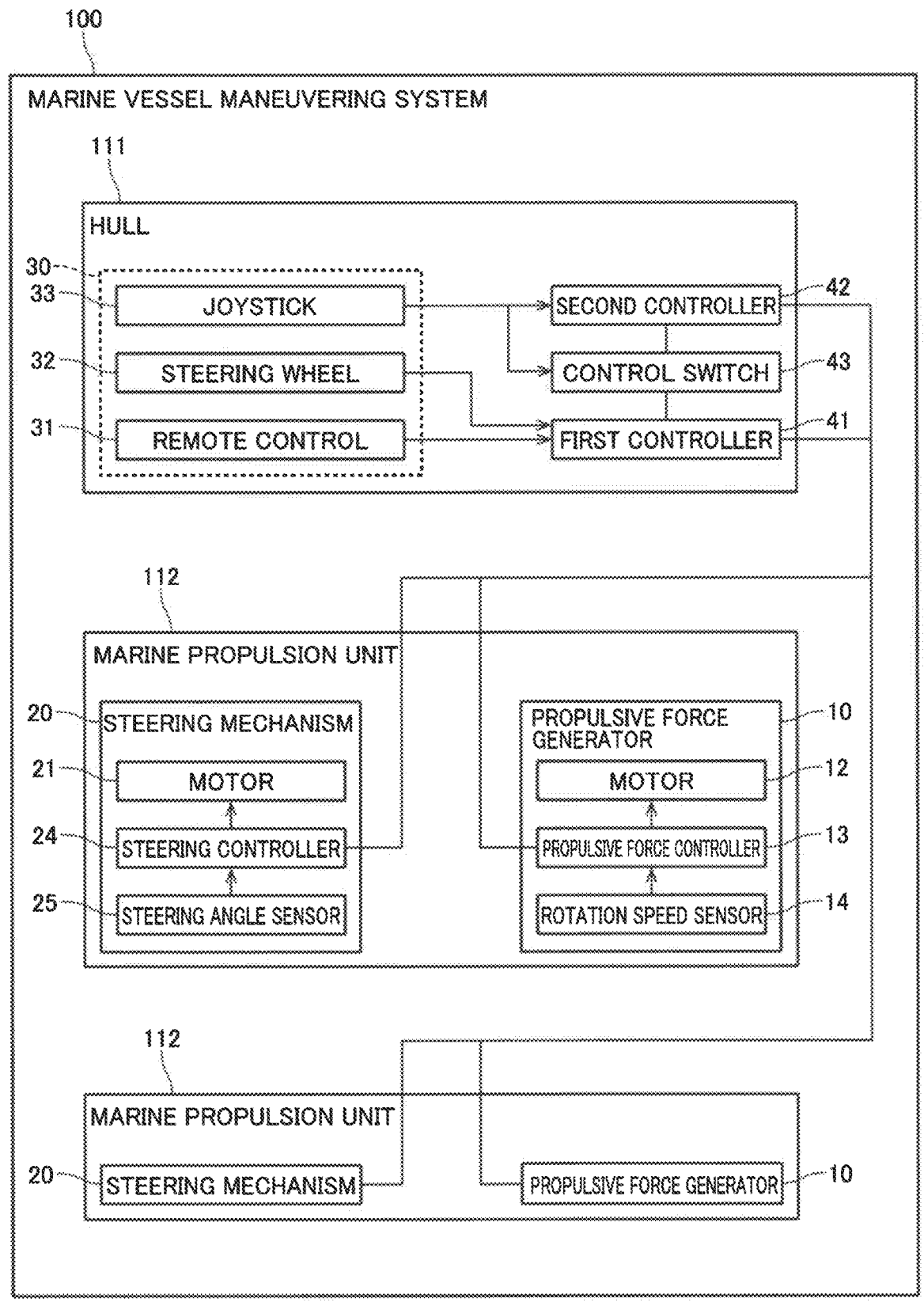
FIG. 3 is a block diagram showing the structure of a marine vessel maneuvering system according to a preferred embodiment of the present invention.

The propulsive force generator 10 includes a propeller 11. As shown in FIG. 3, the propulsive force generator 10 includes a motor 12. As the motor 12 is rotated, the propeller 11 (see FIG. 2) rotates such that the propulsive force generator 10 generates a propulsive force. That is, the propulsive force generator 10 is an electric propulsive force generator (electric propulsion device) driven by the motor 12.

As shown in FIGS. 2A to 2C, the steering mechanism 20 changes the orientation of the propulsive force generator 10 with respect to the marine propulsion unit 112 (marine vessel 110). FIGS. 2A, 2B, and 2C show a state in which the steering mechanism 20 is located at a reference position P10 (a position at which the direction of the propulsive force is parallel or substantially parallel to the forward-rearward direction of the marine vessel 110), a state in which the steering mechanism 20 is steered in the starboard direction from the reference position P10 such that the marine vessel 110 changes its course in the portside direction, and a state in which the steering mechanism 20 is steered in the portside direction from the reference position P10 such that the marine vessel 110 changes its course in the starboard direction, respectively.

Figure 4:
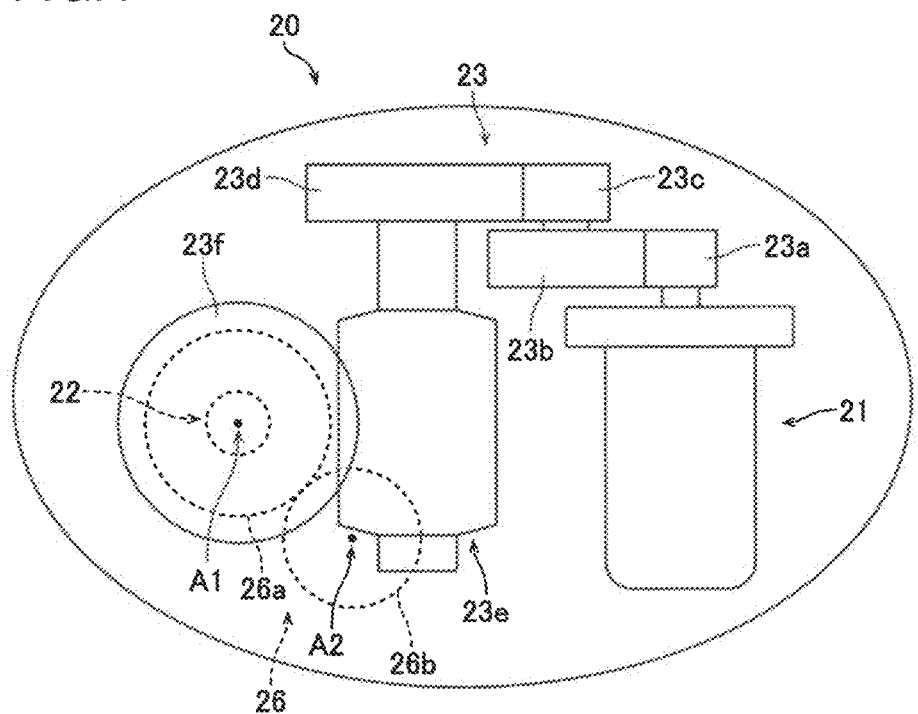
FIG. 4 is a schematic view showing the structure of a steering mechanism of a marine propulsion unit according to a preferred embodiment of the present invention.

Specifically, as shown in FIG. 4, the steering mechanism 20 includes a motor 21, a steering shaft 22 to perform steering (change the direction of the propulsive force), and a plurality of gears 23 to transmit the rotational force of the motor 21 to the steering shaft 22. The steering shaft 22 is a shaft fixed to the propulsive force generator 10. The motor 21 is a DC motor with a brush, for example. The plurality of gears 23 include a spur gear 23a, a spur gear 23b, a spur gear 23c, a spur gear 23d, a worm gear 23e, and a worm wheel 23f, for example.

The spur gear 23a is fixed to a rotation shaft of the motor 21 so as to rotate coaxially with the rotation shaft of the motor 21. The spur gear 23b meshes with the spur gear 23a. The spur gear 23c is fixed to the spur gear 23b so as to rotate coaxially with the spur gear 23b. The spur gear 23d meshes with the spur gear 23c. The worm gear 23e is fixed to the spur gear 23d so as to rotate together with the spur gear 23d. The worm wheel 23f meshes with the worm gear 23e. The worm wheel 23f is fixed to the steering shaft 22 so as to rotate coaxially with the steering shaft 22 about a steering center axis A1. The steering mechanism 20 rotates the steering shaft 22 due to rotation of the motor 21 to steer the propulsive force generator 10 (change the direction of the propulsive force generator 10). In the steering mechanism 20, rotation of the motor 21 is decelerated by the plurality of gears 23 (at a reduction ratio of about 1/400, for example) and transmitted to the steering shaft 22.

Thus, as shown in FIG. 1, the steering mechanism 20 changes (steers) the direction of the propulsive force (thick arrow) of the marine vessel 110. FIG. 1 shows a state in which the steering mechanism 20 is located at the reference position P10 (a position at which the direction of the propulsive force is parallel or substantially parallel to the forward-rearward direction of the marine vessel 110), and a state in which the orientation of the steering mechanism 20 is changed by a steering angle θ from the reference position P10 with chain lines and solid lines, respectively.

A plurality of (two) marine propulsion units 112 are provided for one marine vessel 110. That is, in the marine vessel maneuvering system 100, a plurality of sets (for example, two sets) of propulsive force generators 10 and steering mechanisms 20 are provided.

As shown in FIG. 3, the hull 111 (marine vessel maneuvering system 100) includes an operator 30 to maneuver the marine vessel 110. The operator 30 receives a user's (a user of the marine vessel 110) operation. The operator 30 includes a remote control 31, a steering wheel 32, and a joystick 33.

The remote control 31 includes a lever to adjust the propulsive force, and the lever is operated such that the propulsive force generator 10 (the magnitude of the propulsive force of the propulsive force generator 10) is controlled. The steering wheel 32 is rotatable, and the steering mechanism 20 (steering by the steering mechanism 20) is controlled according to the amount of rotation of the steering wheel 32.

Figure 5:
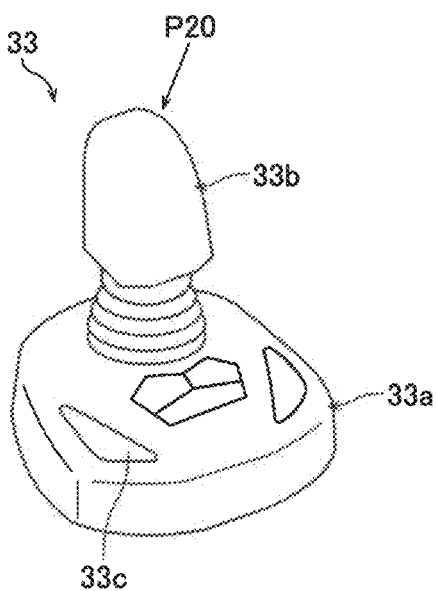
FIG. 5 is a perspective view showing a joystick to maneuver a marine vessel according to a preferred embodiment of the present invention.

As shown in FIG. 5, the joystick 33 includes a base 33a and a lever 33b. The lever 33b is attached so as to be tiltable and rotatable with respect to the base 33a. When the lever 33b is tilted, the propulsive force generator 10 (the magnitude of the propulsive force of the propulsive force generator 10) and the steering mechanism 20 (steering by the steering mechanism 20) are controlled according to the amount and direction of tilting of the lever 33b. When the lever 33b is rotated, the propulsive force generator 10 (the magnitude of the propulsive force of the propulsive force generator 10) and the steering mechanism 20 (steering by the steering mechanism 20) are controlled according to the amount of rotation of the lever 33b. The lever 33b is urged by an urging member such as a spring so as to automatically return to a neutral position P20 (a position at which the lever 33b is upright) when not touched by the user.

As shown in FIG. 3, the hull 111 (marine vessel maneuvering system 100) includes a first controller 41, a second controller 42, and a control switch 43. The first controller 41, the second controller 42, and the control switch 43 include circuit boards including a central processing unit (CPU), a read-only memory (ROM), a random access memory (RAM), etc., for example. The second controller 42 is an example of a "controller".

The first controller 41 controls the propulsive force of the propulsive force generator 10 and steering by the steering mechanism 20 based on a user's operation on the steering wheel 32 and the remote control 31. The second controller 42 controls the propulsive force of the propulsive force generator 10 and steering by the steering mechanism 20 based on a user's operation on the joystick 33.

The first controller 41 and the second controller 42 performs a feedback control on the propulsive force of the propulsive force generator 10 and steering by the steering mechanism 20 by a PI control. Specifically, the propulsive force generator 10 includes a propulsive force controller 13 and a rotation speed sensor 14. The propulsive force controller 13 includes a motor driver and an inverter, for example. The rotation speed sensor 14 detects the rotation speed of the motor 12. The first controller 41 and the second controller 42 control the rotation speed of the motor 12 via the propulsive force controller 13 such that the rotation speed of the motor 12 detected by the rotation speed sensor 14 becomes a target value.

The steering mechanism 20 includes a steering controller 24 and a steering angle sensor 25. The steering controller 24 includes a motor driver, for example. The steering angle sensor 25 detects the rotation angle of the steering shaft 22 (see FIG. 4). As shown in FIG. 4, the steering mechanism 20 includes a sensor gear 26. The sensor gear 26 includes a spur gear 26a and a spur gear 26b. The spur gear 26a is fixed to the worm wheel 23f so as to rotate coaxially with the worm wheel 23f. The spur gear 26b meshes with the spur gear 26a and rotates about a steering angle sensor axis A2. Although not shown in FIG. 4, the steering angle sensor 25 is provided adjacent to or in the vicinity of the spur gear 26b to detect the amount of rotation of the spur gear 26b. The steering angle sensor 25 is an optical sensor or a magnetic sensor, for example. As shown in FIG. 3, the first controller 41 and the second controller 42 control the rotation speed of the motor 21 via the steering controller 24 such that the rotation angle of the steering shaft 22 detected by the steering angle sensor 25 becomes a target value.

The control switch 43 switches between a state in which the first controller 41 controls the propulsive force of the propulsive force generator 10 and steering by the steering mechanism 20 and a state in which the second controller 42 controls the propulsive force of the propulsive force generator 10 and steering by the steering mechanism 20. As shown in FIG. 5, a joystick mode switch 33c is provided on the base 33a of the joystick 33. The joystick mode switch 33c is pressed such that the control switch 43 switches between a state in which the marine vessel maneuvering system 100 receives an operation on the joystick 33 (joystick mode) and a state in which the marine vessel maneuvering system 100 does not receive an operation on the joystick 33.

Figures 6, 7:
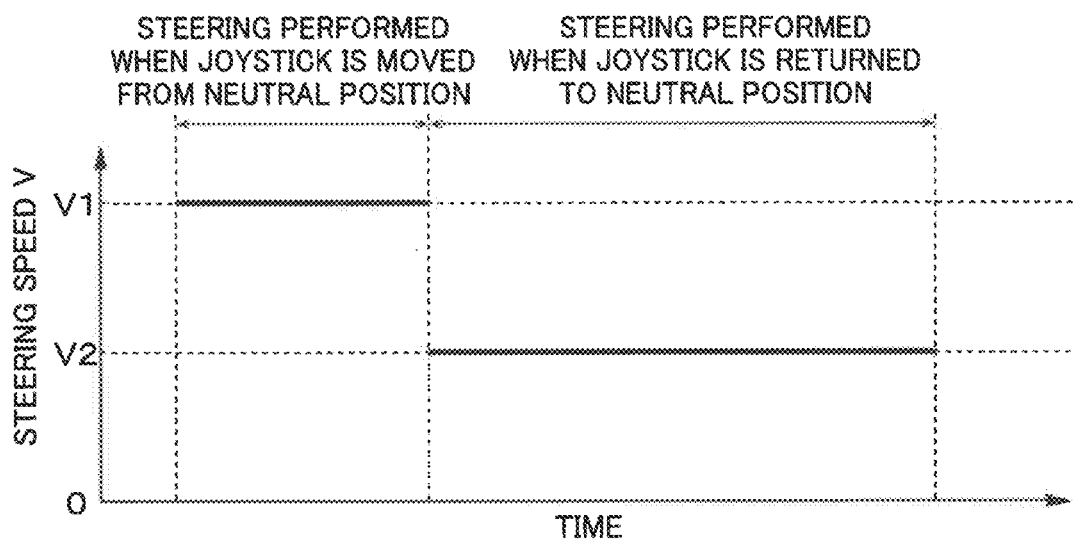
FIG. 6 is a diagram illustrating a control of a propulsive force and steering associated with turning and lateral movement of a marine vessel according to a preferred embodiment of the present invention.
FIG. 7 is a diagram illustrating a steering speed occurring when a joystick is moved from a neutral position and a steering speed occurring when a joystick is returned to the neutral position according to a preferred embodiment of the present invention.

According to preferred embodiments of the present invention, as shown in FIG. 6, the second controller 42 (see FIG. 3) controls a steering speed V (see FIG. 7) to be a first steering speed V1 when the joystick 33 is moved from the neutral position P20, and controls the steering speed V to be a second steering speed V2 that is lower than the first steering speed V1 when the joystick 33 is returned to the neutral position P20. Specifically, the second controller 42 controls the steering speed V to be the second steering speed V2 with generation of the propulsive force of the propulsive force generator 10 stopped when the joystick 33 is returned to the neutral position P20. The second controller 42 controls the steering speed V to be the second steering speed V2 based on the joystick 33 being returned to the neutral position P20 after an operation is performed to turn or laterally move the marine vessel 110.

Specifically, when the marine vessel 110 is turned or laterally moved, the second controller 42 (see FIG. 3) controls both the propulsive force and the steering based on an operation on the joystick 33 when the joystick 33 is moved from the neutral position P20 by a user's operation on the joystick 33. That is, the second controller 42 controls the steering mechanism 20 to steer the propulsive force generator 10 at the first steering speed V1 with the propeller 11 of the propulsive force generator 10 rotated. According to preferred embodiments of the present invention, the first steering speed V1 is set to a maximum steering speed V that is settable in the marine vessel maneuvering system 100.

Then, when the user releases the joystick 33 such that the joystick 33 is returned to the neutral position P20, the second controller 42 (see FIG. 3) controls the steering mechanism 20 to steer the propulsive force generator 10 at the second steering speed V2 such that the steering angle θ (see FIG. 1) is returned to the reference position P10 (see FIG. 1) with generation of the propulsive force stopped. That is, the second controller 42 controls the steering mechanism 20 to steer the propulsive force generator 10 at the second steering speed V2 with rotation of the propeller 11 of the propulsive force generator 10 stopped. According to preferred embodiments of the present invention, as shown in FIG. 7, the second steering speed V2 is set to one half or less of the first steering speed V1 (which is the maximum steering speed V that is settable in the marine vessel maneuvering system 100). FIG. 7 shows a case in which the first steering speed V1 is half of the second steering speed V2. The second steering speed V2 is a constant steering speed V. That is, according to preferred embodiments of the present invention, the second controller 42 controls the steering speed V to be the constant second steering speed V2 when the operator 30 is returned to the neutral position P20.

According to preferred embodiments of the present invention, as shown in FIG. 3, the second controller 42 controls the steering mechanism 20 to change the steering speed between the first steering speed V1 (see FIG. 6) and the second steering speed V2 (see FIG. 6) by adjusting a current supplied to the motor 21. Specifically, the second controller 42 controls the steering controller 24 to adjust power supplied to the motor 21 of the steering mechanism 20 so as to adjust the amount of rotation of the motor 21. Thus, the amount of rotation of the motor 21 is adjusted such that the rotation angle (steering speed V) of the steering shaft 22 of the steering mechanism 20 per unit time is adjusted.

According to preferred embodiments of the present invention, the second controller 42 controls the steering speed V to be the second steering speed V2 (see FIG. 6) by adjusting a steering angle command value α (see FIG. 8) output to the steering mechanism 20 when the joystick 33 is returned to the neutral position P20 (see FIG. 5). Specifically, the second controller 42 controls the steering speed V to be the second steering speed V2 by adjusting the steering angle command value α at predetermined intervals. More specifically, the second controller 42 adjusts and outputs the steering angle command value α as the target value of the steering angle θ (see FIG. 1) every time a predetermined time period (the control cycle of a PI control, for example) elapses to adjust the steering angle every predetermined time period. That is, the steering speed V is indirectly adjusted. The second controller 42 controls the steering speed V to be the second steering speed V2 by filtering the steering angle command value α such that the steering angle becomes smaller than when the steering speed V is controlled to be the first steering speed V1 before the predetermined time period elapses and outputting the filtered steering angle command value α to the steering mechanism 20.

According to preferred embodiments of the present invention, the second controller 42 determines whether or not an actual steering angle β that changes in response to the steering angle command value α has reached the steering angle command value α when the joystick 33 is returned to the neutral position P20, and controls the steering speed V to be the second steering speed V2 when it is determined that the actual steering angle β has reached the steering angle command value α. Specifically, due to a change in the actual steering angle β in response to the steering angle command value α, the actual steering angle β may be larger than the steering angle command value α (the actual steering angle β may not reach the steering angle command value α) immediately after the joystick 33 is returned to the neutral position P20. Then, after a predetermined time period (several hundred milliseconds, for example) elapses after the joystick 33 is returned to the neutral position P20, the actual steering angle β becomes smaller than the steering angle command value α (the steering angle command value α reaches the actual steering angle β). Then, the second controller 42 controls the steering mechanism 20 such that the steering speed V becomes the second steering speed V2 (transmits the filtered steering angle command value to the steering mechanism 20) at the timing at which the actual steering angle β becomes smaller than the steering angle command value α (the steering angle command value α reaches the actual steering angle β). Immediately after the joystick 33 is returned to the neutral position P20, the steering speed V is controlled to be the first steering speed V1 until the actual steering angle β reaches the steering angle command value α.

According to preferred embodiments of the present invention, the second controller 42 controls the steering mechanism 20 to change the steering speed V from the second steering speed V2 to the first steering speed V1 when the joystick 33 is moved from the neutral position P20 while the steering mechanism 20 is steering the propulsive force generator 10 at the second steering speed V2. Specifically, when a subsequent operation is performed on the joystick 33 (the joystick 33 is moved from the neutral position P20) while the steering angle θ is being returned to the reference position P10 based on the joystick 33 being moved from the neutral position P20, the second controller 42 controls the steering mechanism 20 such that the return of the steering angle θ to the reference position P10 is interrupted, and steering based on the subsequent operation is immediately performed (at the first steering speed V1).

As described above, the plurality of sets (two sets) of propulsive force generators 10 and steering mechanisms 20 are provided. Therefore, according to preferred embodiments of the present invention, the second controller 42 controls the steering speeds V of the plurality of sets (two sets) of steering mechanisms 20 to be the second steering speed V2 when the operator 30 (joystick 33) is returned to the neutral position P20.

Figure 8:
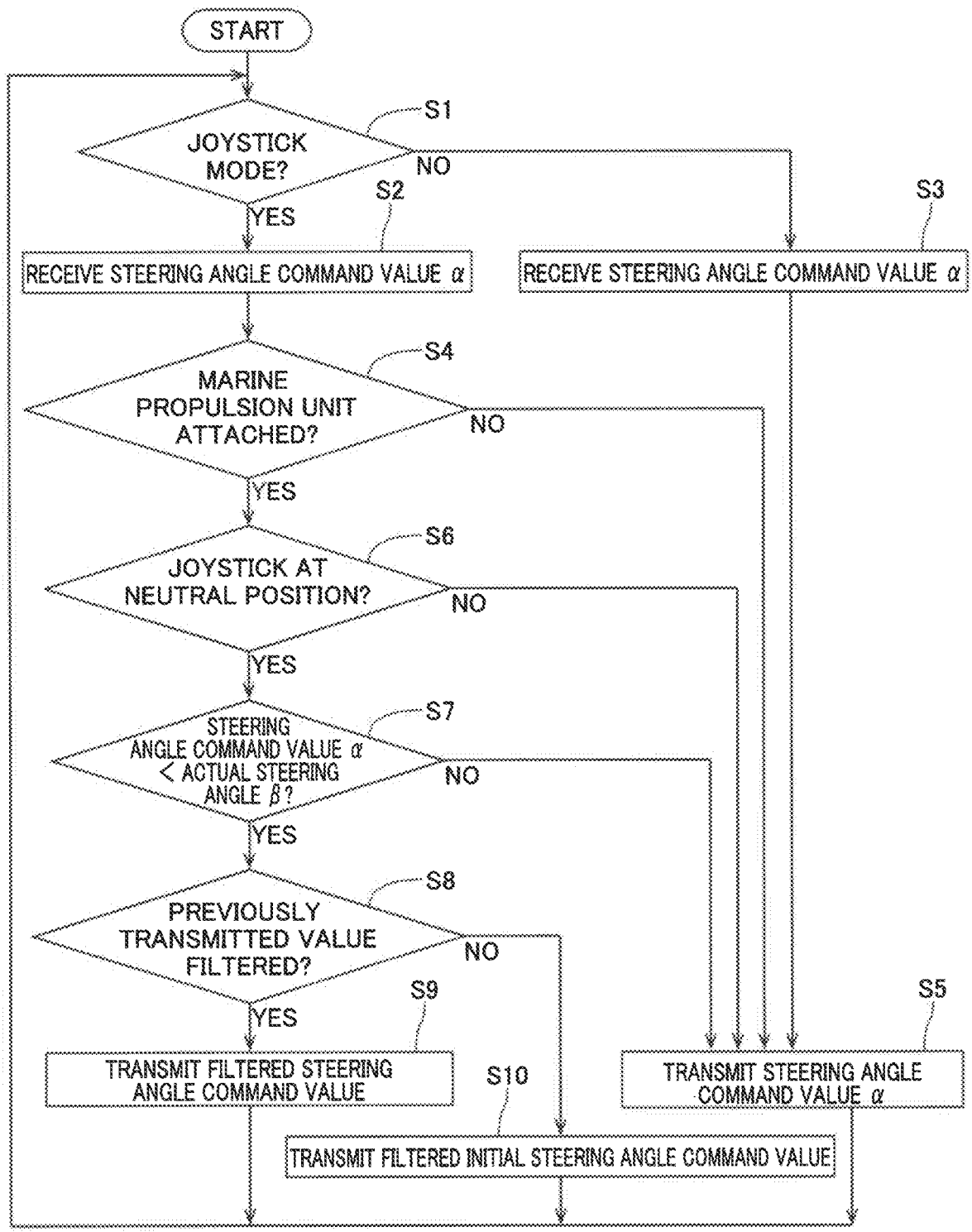
FIG. 8 is a control flow of steering by a joystick in a marine vessel maneuvering system according to a preferred embodiment of the present invention.

A control flow of steering by the joystick 33 in the marine vessel maneuvering system 100 is now described with reference to FIG. 8. A control shown in FIG. 8 is performed by the second controller 42.

First, in step S1, the second controller 42 determines whether or not the marine vessel maneuvering system 100 is in the joystick mode (a state in which an operation on the joystick 33 is received). When it is determined in step S1 that the marine vessel maneuvering system 100 is in the joystick mode, the second controller 42 advances to step S2. When it is determined in step S1 that the marine vessel maneuvering system 100 is not in the joystick mode, the second controller 42 advances to step S3.

In step S2, the second controller 42 receives the steering angle command value α (the unfiltered steering angle command value α or the filtered steering angle command value α) from the joystick 33. Then, the second controller 42 advances to step S4.

In step S3, the second controller 42 receives the steering angle command value α (the unfiltered steering angle command value α or the filtered steering angle command value α) from the joystick 33 as in step S2. Then, the second controller 42 advances to step S5.

In step S4, the second controller 42 determines whether or not the marine propulsion unit 112 is attached to the hull 111. When it is determined in step S4 that the marine propulsion unit 112 is attached to the hull 111, the second controller 42 advances to step S6. When it is determined in step S4 that the marine propulsion unit 112 is not attached to the hull 111, the second controller 42 advances to step S5.

In step S5, the second controller 42 transmits the steering angle command value α (the unfiltered steering angle command value α or the filtered steering angle command value α) to the marine propulsion unit 112 (steering mechanism 20). Then, the second controller 42 returns to step S1.

In step S6, the second controller 42 determines whether or not the joystick 33 is at the neutral position P20. When it is determined in step S6 that the joystick 33 is at the neutral position P20, the second controller 42 advances to step S7. When it is determined in step S6 that the joystick 33 is not at the neutral position P20, the second controller 42 advances to step S5.

In step S7, the second controller 42 determines whether or not the steering angle command value α is smaller than the actual steering angle β (whether or not the actual steering angle β that changes in response to the steering angle command value α has reached the steering angle command value α).

When it is determined in step S7 that the steering angle command value α is smaller than the actual steering angle β (the actual steering angle β has reached the steering angle command value α), the second controller 42 advances to step S8. When it is determined in step S7 that the steering angle command value α is not smaller than the actual steering angle β (the actual steering angle β has not reached the steering angle command value α), the second controller 42 advances to step S5.

In step S8, the second controller 42 determines whether or not the previously transmitted value (previously transmitted steering angle command value α) is filtered (whether or not the steering speed V is controlled to the second steering speed V2). When it is determined in step S8 that the previously transmitted value (previously transmitted steering angle command value α) is filtered (the steering speed V is controlled to the second steering speed V2), the second controller 42 advances to step S9. When it is determined in step S8 that the previously transmitted value (previously transmitted steering angle command value α) is not filtered (the steering speed V is not controlled to the second steering speed V2 (i.e., the steering speed V is controlled to the first steering speed V1)), the second controller 42 advances to step S10.

In step S9, the second controller 42 transmits the filtered steering angle command value α to the marine propulsion unit 112 (steering mechanism 20). Then, the second controller 42 returns to step S1.

In step S10, the second controller 42 filters the steering angle command value α and transmits it to the marine propulsion unit 112 (steering mechanism 20) (transmits a filtered initial steering angle command value). Then, the second controller 42 returns to step S1.

The control flow described above may be configured as follows. For example, when it is determined in step S1 that the marine vessel maneuvering system 100 is not in the joystick mode, the second controller 42 may return to step S1 without advancing to step S3. When it is determined in step S4 that the marine propulsion unit 112 is not attached to the hull 111, the second controller 42 may return to step S1 without advancing to step S5.

According to the various preferred embodiments of the present invention described above, the following advantageous effects are achieved.

According to a preferred embodiment of the present invention, the second controller 42 is configured or programmed to control the steering speed V to be the first steering speed V1 when the joystick 33 is moved from the neutral position P20, and control the steering speed V to be the second steering speed V2 that is lower than the first steering speed V1 when the operator 30 is returned to the neutral position P20. Accordingly, when the joystick 33 is returned to the neutral position P20, the steering speed V at which the steering angle θ is returned to the reference position P10 becomes relatively low. Therefore, when the steering angle θ is returned to the reference position P10, the driving speed of the steering mechanism 20 is decreased such that the driving noise of the steering mechanism 20 becomes relatively small. Consequently, the driving noise of the steering mechanism 20 is significantly reduced or prevented. According to preferred embodiments of the present invention, the propulsive force generator 10 is an electric propulsive force generator driven by the motor 12. Thus, the driving noise of the steering mechanism 20 is particularly likely to be noticeable, and thus the driving noise of the steering mechanism 20 is effectively significantly reduced or prevented. Furthermore, the operation of components of the steering mechanism 20 is significantly reduced or prevented by a decrease in the driving speed of the steering mechanism 20 at which the steering angle θ is returned to the reference position P10, and thus the life of the components of the steering mechanism 20 is improved.

According to a preferred embodiment of the present invention, the second controller 42 is configured or programmed to control the steering speed V to be the second steering speed V2 when the joystick 33 is returned to the neutral position P20 and the propulsive force of the propulsive force generator 10 is stopped. Accordingly, the steering speed V at which the steering angle θ is returned to the reference position P10 with generation of the propulsive force stopped becomes relatively low. Consequently, a propulsive force is not generated, and a water flow is not generated. Thus, the steering speed V becomes relatively low in a state in which the driving noise of the steering mechanism 20 is likely to be noticeable, and thus the driving noise of the steering mechanism 20 due to driving of the steering mechanism 20 is effectively significantly reduced or prevented.

According to a preferred embodiment of the present invention, the second controller 42 is configured or programmed to control the steering speed V to be the second steering speed V2 by adjusting the steering angle command value α output to the steering mechanism 20 when the joystick 33 is returned to the neutral position P20. Accordingly, the steering angle command value α as the target value of the steering angle θ is continuously adjusted such that the steering speed V is indirectly adjusted, and thus the steering speed V at which the steering angle θ is returned to the reference position P10 is easily controlled to be the second steering speed V2.

According to a preferred embodiment of the present invention, the second controller 42 is configured or programmed to determine whether or not the actual steering angle β that changes in response to the steering angle command value α has reached the steering angle command value α when the joystick 33 is returned to the neutral position P20, and control the steering speed V to be the second steering speed V2 when it is determined that the actual steering angle β has reached the steering angle command value α. Accordingly, when the steering angle θ is returned to the reference position P10, the steering speed V is controlled to be the second steering speed V2 after the actual steering angle β reaches the steering angle command value α, and thus the steering angle command value α is appropriately controlled such that the steering speed V becomes the second steering speed V2.

According to a preferred embodiment of the present invention, the second controller 42 is configured or programmed to control the steering speed V to be the second steering speed V2 by adjusting the steering angle command value α at the predetermined intervals. Accordingly, the steering angle command value α as the target value of the steering angle θ is adjusted at the predetermined intervals, and thus the steering speed V at which the steering angle θ is returned to the reference position P10 is more easily controlled to be the second steering speed V2.

According to a preferred embodiment of the present invention, the second controller 42 is configured or programmed to control the steering speed V to be the second steering speed V2 based on the joystick 33 being returned to the neutral position P20 after an operation is performed to turn or laterally move the marine vessel 110. Accordingly, the steering speed V at which the steering angle θ is returned to the reference position P10 after the marine vessel 110 is turned or laterally moved becomes relatively low. Consequently, when the joystick 33 is returned to the neutral position P20 after the marine vessel 110 is turned or laterally moved, a propulsive force is not generated, and a water flow is not generated. Thus, the steering speed V becomes relatively low in a state in which the driving noise of the steering mechanism 20 is likely to be noticeable, and thus the driving noise of the steering mechanism 20 due to driving of the steering mechanism 20 is effectively significantly reduced or prevented.

According to a preferred embodiment of the present invention, the second steering speed V2 is set to one half or less of the first steering speed V1. Accordingly, the steering speed V at which the steering angle θ is returned to the reference position P10 is sufficiently decreased such that the driving noise of the steering mechanism 20 is significantly reduced or prevented.

According to a preferred embodiment of the present invention, the first steering speed V1 is set to the maximum settable steering speed V, and the second steering speed V2 is set to one half or less of the first steering speed V1. Accordingly, the joystick 33 is operated such that the steering speed V at which the steering angle θ is returned to the reference position P10 is sufficiently decreased such that the driving noise of the steering mechanism 20 is significantly reduced or prevented without decreasing the steering speed V occurring when the operator 30 is moved from the neutral position P20.

According to a preferred embodiment of the present invention, the second controller 42 is configured or programmed to control the steering speed V to be the constant second steering speed V2 when the joystick 33 is returned to the neutral position P20. Accordingly, as compared with a case in which the second steering speed V2 is changed, a control process of the steering speed V at which the steering angle θ is returned to the reference position P10 is simplified.

According to a preferred embodiment of the present invention, the second controller 42 is configured or programmed to control the steering mechanism 20 to change the steering speed V from the second steering speed V2 to the first steering speed V1 when the joystick 33 is moved from the neutral position P20 while the steering mechanism 20 is steering the propulsive force generator 10 at the second steering speed V2. Accordingly, even when a subsequent operation is performed on the joystick 33 while the steering angle θ is being returned to the reference position P10 with the steering speed V decreased from the first steering speed V1 to the second steering speed V2, steering by the steering mechanism 20 is immediately controlled with the steering speed V returned from the second steering speed V2 to the first steering speed V1 based on the subsequent operation on the joystick 33.

According to a preferred embodiment of the present invention, the steering mechanism 20 includes the motor 21, the steering shaft 22 to perform steering, and the plurality of gears 23 to transmit the rotational force of the motor 21 to the steering shaft 22. Furthermore, the second controller 42 is configured or programmed to control the steering mechanism 20 to change the steering speed between the first steering speed V1 and the second steering speed V2 by adjusting a current supplied to the motor 21. Accordingly, the current supplied to the motor 21 is adjusted such that the steering speed V is easily controlled to be the first steering speed V1 and the second steering speed V2 via the plurality of gears 23 and the steering shaft 22. Furthermore, the operation of the motor 21, the gears 23, and the steering shaft 22 is significantly reduced or prevented by a decrease in the driving speed of the steering mechanism 20 at which the steering angle θ is returned to the reference position P10. Therefore, the life of the motor 21, the gears 23, and the steering shaft 22 is improved.

According to a preferred embodiment of the present invention, the motor 21 of the steering mechanism 20 is a DC motor with a brush. Accordingly, the operation of the brush of the DC motor is significantly reduced or prevented by a decrease in the driving speed of the steering mechanism 20 at which the steering angle θ is returned to the reference position P10, and thus the life of the motor 21 is effectively improved.

According to a preferred embodiment of the present invention, the second controller 42 is configured or programmed to perform a feedback control on steering by the steering mechanism 20 by a PI control. Accordingly, the accuracy of a control of steering by the steering mechanism 20 is improved, and thus the accuracy of a control to change the steering speed V to the second steering speed V2 is improved.

According to a preferred embodiment of the present invention, the plurality of sets (two sets) of propulsive force generators 10 and steering mechanisms 20 are provided. Furthermore, the second controller 42 is configured or programmed to control the steering speeds V of the plurality of (two) steering mechanisms 20 to the second steering speed V2 when the joystick 33 is returned to the neutral position P20. Accordingly, even when a plurality of sets (two sets) of propulsive force generators 10 and steering mechanism 20 are provided, the steering speeds V of all of the plurality of steering mechanisms 20 are controlled to be the second steering speed V2, and thus the steering speed V at which the steering angle θ is returned to the reference position P10 becomes relatively low without shifting the timing of returning the steering angle θ to the reference position P10 among the plurality of steering mechanisms 20.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the plurality of sets (two sets) of propulsive force generators 10 and steering mechanisms 20 are preferably provided in the preferred embodiments described above, the present invention is not restricted to this. In the present invention, three or more sets of propulsive force generators and steering mechanisms may alternatively be provided, or only one set of a propulsive force generator and a steering mechanism may alternatively be provided.

While the second controller 42 (controller) preferably performs a feedback control on steering by the steering mechanism 20 by a PI control in the preferred embodiments described above, the present invention is not restricted to this. In the present invention, the controller may alternatively perform a feedback control on steering by the steering mechanism by a PD control or a PID control.

While the motor 21 of the steering mechanism 20 is preferably a DC motor with a brush in the preferred embodiments described above, the present invention is not restricted to this. In the present invention, the motor of the steering mechanism may alternatively be a DC motor without a brush, or may be a motor other than a DC motor, such as an AC motor or a stepping motor.

While the second controller 42 (controller) preferably controls the steering mechanism 20 by adjusting a current supplied to the motor 21 in the preferred embodiments described above, the present invention is not restricted to this. In the present invention, the controller may alternatively control the steering mechanism by adjusting an oil pressure.

While the second controller 42 (controller) preferably controls the steering mechanism 20 to change the steering speed V from the second steering speed V2 to the first steering speed V1 when the joystick 33 (operator) is moved from the neutral position P20 while the steering mechanism 20 is steering the propulsive force generator 10 at the second steering speed V2 in the preferred embodiments described above, the present invention is not restricted to this. In the present invention, the controller may alternatively control the steering mechanism to not change the steering speed from the second steering speed to the first steering speed when the operator is moved from the neutral position while the steering mechanism is steering the propulsive force generator 10 at the second steering speed.

While the second controller 42 (controller) preferably controls the steering speed V to be the constant second steering speed V2 when the joystick 33 (operator) is returned to the neutral position P20 in the preferred embodiments described above, the present invention is not restricted to this. In the present invention, the controller may alternatively control the steering speed to be a changing second steering speed when the operator is returned to the neutral position.

While the first steering speed V1 is preferably set to the maximum settable steering speed V in the preferred embodiments described above, the present invention is not restricted to this. In the present invention, the first steering speed may alternatively be set to a value that is smaller than the maximum settable steering speed.

While the second steering speed V2 is preferably set to one half or less of the first steering speed V1 in the preferred embodiments described above, the present invention is not restricted to this. In the present invention, the second steering speed may alternatively be set to a value that is larger than one half of the first steering speed.

While the second controller 42 (controller) preferably controls the steering speed V to be the second steering speed V2 based on the joystick 33 (operator) being returned to the neutral position P20 after an operation is performed to turn or laterally move the marine vessel 110 in the preferred embodiments described above, the present invention is not restricted to this. In the present invention, the controller may not control the steering speed to be the second steering speed based on the operator being returned to the neutral position after an operation is performed to turn the marine vessel. Alternatively, the controller may not control the steering speed to be the second steering speed based on the operator being returned to the neutral position after an operation is performed to laterally move the marine vessel. Alternatively, the controller may control the steering speed to be the second steering speed based on the operator being returned to the neutral position after a maneuvering operation (such as rotation) other than turning and lateral movement of the marine vessel is performed.

While the second controller 42 (controller) preferably controls the steering speed V to be the second steering speed V2 when the operator 30 is returned to the neutral position P20 based on a user's operation on the joystick 33 to steer the marine vessel 110 in the preferred embodiments described above, the present invention is not restricted to this. In the present invention, the controller may alternatively control the steering speed to be the second steering speed when the operator is returned to the neutral position based on a user's operation on the steering wheel or the remote control to steer the marine vessel.

While the second controller 42 (controller) preferably controls the steering speed V to be the second steering speed V2 by adjusting the steering angle command value α output to the steering mechanism 20 when the joystick 33 (operator) is returned to the neutral position P20 in the preferred embodiments described above, the present invention is not restricted to this. In the present invention, the controller may alternatively control the steering speed to be the second steering speed by adjusting a speed command value output to the steering mechanism when the operator is returned to the neutral position. In such a case, the steering speed is directly adjusted by adjusting the speed command value, and thus the steering speed at which the steering angle is returned to the reference position is easily controlled to be the second steering speed.

While the second controller 42 (controller) preferably controls the steering speed V to be the second steering speed V2 when the joystick 33 (operator) is returned to the neutral position P20 and the propulsive force of the propulsive force generator 10 is stopped in the preferred embodiments described above, the present invention is not restricted to this. In the present invention, the controller may alternatively control the steering speed to be the second steering speed without (completely) stopping generation of the propulsive force of the propulsive force generator when the operator is returned to the neutral position.

While the propulsive force generator 10 is preferably an electric propulsive force generator driven by the motor 12 in the preferred embodiments described above, the present invention is not restricted to this. In the present invention, the propulsive force generator may alternatively be a hybrid propulsive force generator driven by the motor and the engine.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel maneuvering system comprising:
   a propulsive force generator to generate a propulsive force to propel a marine vessel;
   a steering mechanism to steer the propulsive force generator; and
   a controller configured or programmed to control the propulsive force of the propulsive force generator and steering by the steering mechanism based on a user's operation on an operator to maneuver the marine vessel; wherein
   the controller is configured or programmed to control a steering speed to be a first steering speed when the operator is moved from a neutral position, and to control the steering speed to be a second steering speed that is lower than the first steering speed when the operator is returned to the neutral position and the propulsive force of the propulsive force generator is stopped or not completely stopped.

2. The marine vessel maneuvering system according to claim 1, wherein the controller is configured or programmed to control the steering speed to be the second steering speed by adjusting a steering angle command value or a speed command value output to the steering mechanism when the operator is returned to the neutral position.

3. The marine vessel maneuvering system according to claim 2, wherein the controller is configured or programmed to determine whether or not an actual steering angle that changes in response to the steering angle command value has reached the steering angle command value when the operator is returned to the neutral position, and to control the steering speed to be the second steering speed when it is determined that the actual steering angle has reached the steering angle command value.

4. The marine vessel maneuvering system according to claim 2, wherein the controller is configured or programmed to control the steering speed to be the second steering speed by adjusting the steering angle command value at predetermined intervals.

5. The marine vessel maneuvering system according to claim 1, wherein the controller is configured or programmed to control the steering speed to be the second steering speed when the operator including at least one of a joystick, a steering wheel, or a remote control to maneuver the marine vessel is returned to the neutral position.

6. The marine vessel maneuvering system according to claim 1, wherein the controller is configured or programmed to control the steering speed to be the second steering speed based on the operator being returned to the neutral position after an operation of at least one of turning, lateral movement, or rotation of the marine vessel is performed.

7. The marine vessel maneuvering system according to claim 1, wherein the second steering speed is one half or less of the first steering speed.

8. The marine vessel maneuvering system according to claim 7, wherein
the first steering speed is a maximum settable steering speed; and
the second steering speed is one half or less of the first steering speed.

9. The marine vessel maneuvering system according to claim 1, wherein the controller is configured or programmed to control the steering speed to be a constant second steering speed when the operator is returned to the neutral position.

10. The marine vessel maneuvering system according to claim 1, wherein the controller is configured or programmed to control the steering mechanism to change the steering speed from the second steering speed to the first steering speed when the operator is moved from the neutral position while the steering mechanism is steering the propulsive force generator at the second steering speed.

11. The marine vessel maneuvering system according to claim 1, wherein the steering mechanism includes:
a motor;
a steering shaft to perform the steering; and
a plurality of gears to transmit a rotational force of the motor to the steering shaft; and
the controller is configured or programmed to control the steering mechanism to change the steering speed between the first steering speed and the second steering speed by adjusting a current supplied to the motor.

12. The marine vessel maneuvering system according to claim 11, wherein the motor of the steering mechanism includes a DC motor with a brush.

13. The marine vessel maneuvering system according to claim 1, wherein the controller is configured or programmed to perform a feedback control on the steering by the steering mechanism by a proportional integral control.

14. The marine vessel maneuvering system according to claim 1, wherein
the propulsive force generator and the steering mechanism include a plurality of sets of propulsive force generators and steering mechanisms; and
the controller is configured or programmed to control steering speeds of the steering mechanisms to the second steering speed when the operator is returned to the neutral position.

15. A marine vessel comprising:
a hull; and
a marine propulsion unit attached to the hull; wherein
the marine propulsion unit includes:
a propulsive force generator to generate a propulsive force to propel the marine vessel; and
a steering mechanism to steer the propulsive force generator;
the hull includes:
an operator to maneuver the marine vessel; and
a controller configured or programmed to control the propulsive force of the propulsive force generator and steering by the steering mechanism based on a user's operation on the operator; and
the controller is configured or programmed to control a steering speed to be a first steering speed when the operator is moved from a neutral position, and to control the steering speed to be a second steering speed that is lower than the first steering speed when the operator is returned to the neutral position and the propulsive force of the propulsive force generator is stopped or not completely stopped.

16. The marine vessel according to claim 15, wherein the controller is configured or programmed to control the steering speed to be the second steering speed by adjusting a steering angle command value or a speed command value output to the steering mechanism when the operator is returned to the neutral position.

17. The marine vessel according to claim 16, wherein the controller is configured or programmed to determine whether or not an actual steering angle that changes in response to the steering angle command value has reached the steering angle command value when the operator is returned to the neutral position, and to control the steering speed to be the second steering speed when it is determined that the actual steering angle has reached the steering angle command value.

18. The marine vessel according to claim 16, wherein the controller is configured or programmed to control the steering speed to be the second steering speed by adjusting the steering angle command value at predetermined intervals.

* * * * *